United States Patent
Colgan et al.

(10) Patent No.: US 6,816,225 B2
(45) Date of Patent: Nov. 9, 2004

(54) LCD CELL CONSTRUCTION BY MECHANICAL THINNING OF A COLOR FILTER SUBSTRATE

(75) Inventors: Evan George Colgan, Chestnut Ridge, NY (US); Fuad Elias Doany, Katonah, NY (US); Tomohito Jounai, Moriyama (JP); Satoshi Maruyama, Shiga-ken (JP); Hideo Ohkuma, Shiga-ken (JP); Rama Nand Singh, Bethel, CT (US); Masaru Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 09/891,682

(22) Filed: Jun. 26, 2001

(65) Prior Publication Data

US 2002/0196405 A1 Dec. 26, 2002

(51) Int. Cl.[7] ...................... G02F 1/1333; G02F 1/1335
(52) U.S. Cl. ...................... 349/158; 349/187; 349/112; 349/106
(58) Field of Search ................. 349/158, 187, 349/112, 160, 106

(56) References Cited

U.S. PATENT DOCUMENTS

| | | | | |
|---|---|---|---|---|
| 4,171,874 A | * | 10/1979 | Bigelow et al. | 350/345 |
| 4,183,629 A | * | 1/1980 | Nishimura et al. | 350/334 |
| 4,456,336 A | * | 6/1984 | Chung et al. | 350/338 |
| 5,766,493 A | * | 6/1998 | Shin | 216/23 |
| 5,990,993 A | * | 11/1999 | Haas | 349/96 |
| 6,093,577 A | * | 7/2000 | van der Groen et al. | 438/30 |
| 6,266,112 B1 | * | 7/2001 | Mizobata et al. | 349/113 |
| 6,331,882 B1 | * | 12/2001 | Shimodaira et al. | 349/122 |
| 6,452,091 B1 | * | 9/2002 | Nakagawa et al. | 136/261 |

FOREIGN PATENT DOCUMENTS

| | | | |
|---|---|---|---|
| JP | 5629251 | 7/1981 | |
| JP | 3253098 | 3/1991 | |
| JP | 4049371 | 6/1992 | |
| JP | 4049372 | 6/1992 | |
| JP | 9-230317 | * 9/1997 | ......... G02F/1/1333 |

OTHER PUBLICATIONS

Ohkuma et al "Development of a Manufacturing Process for a Thin, lightweight LCD Cell" May 2000 SID pp. 168–169.*
Gautam Meda "13.2: Support Design For Reducing The Sag Of Horizontally Supported Sheets" 2000 SID pp. 161–163.
Rolf Aschenbrenner "Flip Chip Attachment Using Anisotropic Conductive Adhesives and Electroless Nickel Bumps" 1997 IEEE pp. 95–100.
Hideo Ohkuma et al. "Development of a Manufacturing Process for a Thin. Lightweight LCD Cell" 2000 SID pp. 168–169.
H. Nishida et al. "Micropitch Connection Using Anisotropic Conductive Materials For Driver IC Attachment To A Liquid Crystal Display" 1998 pp. 517–525.

* cited by examiner

Primary Examiner—Tarifur R. Chowdhury
Assistant Examiner—Mike Qi
(74) Attorney, Agent, or Firm—Robert M. Trepp; Frank V. DeRosa

(57) ABSTRACT

A display device and method for fabricating a liquid crystal cell are disclosed. A liquid crystal cell includes a first substrate, and a second substrate attached to the first substrate. The first substrate has a same thickness as the second substrate. The first substrate is lapped at a first rate while concurrently lapping the second substrate at a second rate, which is different from the first rate. The first substrate and the second substrate are thinned to different thicknesses. The thinner of the first and second substrates is provided on a viewer side of a collimate and post diffuse type liquid crystal cell to reduce depixelization.

18 Claims, 5 Drawing Sheets

LCD CELL CONSTRUCTION BY MECHANICAL THINNING OF A COLOR FILTER SUBSTRATE

BACKGROUND OF THE INVENTION

1. Field of the Invention

The present invention relates to display construction, and more particularly to displays and methods for reducing thickness of the front glass to reduce depixelization in collimate and post diffuse type active matrix displays.

2. Description of the Related Art

For notebook liquid crystal displays (LCD), it is very desirable to make the display as thin and light as possible. In recent years, 0.7 mm thick glass substrates have been adopted by LCD display manufacturers to replace the previous standard of 1.1 mm thick glass. To reduce manufacturing costs, starting glass substrate size has continued to increase and is now approaching 1 m by 1 m. This creates severe manufacturing problems due to the sag of the glass when supported horizontally only along two side edges. For a 1 m by 1 m by 0.7 mm substrate, the sag would be about 108 mm (G. Meda, "Support Design for Reducing the Sag of Horizontally Supported Sheets"' SID '00 Digest, pp. 161–163).

Using thinner starting glass substrates also requires the expensive redesign of the robotic handlers on all the processing equipment. Therefore, it is less desirable economically to achieve thinner displays by using thinner starting glass substrates.

An alternative method of making a thin liquid crystal display for notebook applications based on a combination of lapping and polishing of the glass after the cell has been assembled has been described (See, e.g., H. Ohkuma, K. Tajima, and K. Tomiki, "Development of a manufacturing process for a thin lightweight LCD cell". SID '00 Digest, pp. 168–169). As described in this publication, after assembling a cell with an 0.7 mm thick array glass substrate with an 0.7 mm thick color filter substrate, the two substrates are simultaneously thinned down to 0.5 mm so that the final cell thickness is about 1.0 mm. The bulk of the material (e.g., >90%) is removed by lapping using rough abrasive compounds. Polishing is used to make both sides of the cell smooth using fine abrasive compounds. The use of lapping reduces the total process time. Generally, mechanical thinning assumes equal thinning for both the array glass and the color filter glass.

Other methods of thinning down LCD displays along with double sealing methods to protect the electrical bonding area during the thinning process have also been disclosed. (Japanese Patent numbers H05-249422, H05-249423, H05-61011, S56-29251 and U.S. Pat. No. 5,766,493). In Japanese Patent numbers H05-249422 and H05-249423, a thinning process based on etching is described along with a double seal to protect the electrical bonding area. In Japanese Patent number H05-61011 assigned to Rohm, a process is described where after sealing two substrates together with patterned transparent electrodes on the substrates, the glass substrates are thinned by lapping. After lapping, the liquid crystal is injected.

In Japanese Patent number S56-29261 assigned to Hitachi, after cell processing, both the glass substrates were thinned down to achieve the proper cell gap. U.S. Pat. No. 5,766,493, assigned to LG Electronics, is directed at using a combination of both etching and polishing to thin down an LCD array.

Thinning the array substrate makes the attachment of the electrical connections to the array more difficult, especially if chip-on-glass (COG) bonding is used. The trend in the industry for portable displays is to use COG attachment instead of the more traditional tape carrier package (TCP). For TCP, the driver chip is on a flex circuit which is bonded to the substrate. COG results in a thinner display module and reduced cost (see H. Nishida, K. Sakamoto, H. Ogawa, H. Ogawa, "Micropitch connection using anisotropic conductive materials for driver IC attachment to a liquid crystal display", IBM J. Res. Develop. Vol. 42 No. ¾ May/July 1998, pp. 517–525).

With COG, the single crystal silicon driver chip is bonded directly to the array glass substrate and an anisotropic conducting adhesive or film (ACA or ACF) is used to make electrical connections between the driver chip and the array plate (R. Aschenbrenner, A. Ostmann, G. Motulla, E. Zakel, and H. Reichl, "Flip chip attachment using anisotropic conductive adhesives and electroless nickel bumps", IEEE Trans on components, packaging, and manufacturing technology-part C, Vol. 20, No. 2, April 1997 pp. 95–100). The bonding process uses heat and pressure to attach the chip. The thermal expansion coefficient of the silicon chip and the glass substrate are different, so after bonding when they cool down to room temperature, there is a thermal expansion mismatch stress.

The stiffness of the Si is much greater than that of the glass and since they are of approximately the same thickness (about 0.7 mm for the glass and 0.5 mm for the Si chip) the glass tends to bend more to relieve the stress than the Si driver chip does. This leads to problems in maintaining the liquid crystal cell gap uniformity near the driver chips and in maintaining good electrical contact between the driver chip and the array substrate. Reducing the thickness of the array substrate glass increases these difficulties since the glass then tends to bend further.

An additional problem with the thinner glass is increased breakage during the module processing. Reducing the substrate thickness from 0.7 mm to 0.5 mm has resulted in an 55% increase in breakage. The breakage is generally due to chips along the edge of the substrate, which results in cracks in the glass.

LCD displays, typically include two glass plates or substrates, e.g., a color filter (CF) substrate and a thin film transistor (TFT) array substrate. Cracking concerns are especially important for the TFT array substrate since this substrate extends beyond the CF substrate on at least two sides to provide space for the electrical interconnection to the gate and data lines on the TFT array substrate.

In a collimate and post diffuse (CPD) type display, see e.g., U.S. Pat. No. 4,171,874 and Zimmerman et al. in "Viewing-angle enhancement system for LCDs," in SID '95 Digest, pp. 793–796, or McFarland et al. in "SPECTRA VUE™ viewing angle enhancement system for LCDs," in Asia Display '95 Digest, pp. 739–742, a highly collimating backlight is used in combination with a diffuser on the viewer side of the display (typically, the exterior side of the color filter substrate, outside the front polarizer).

For low resolution collimate and post diffuse type displays (e.g., less than about 100 pixels per inch (ppi)), the degree of collimation required is determined largely by the contrast ratio versus angle of transmission of the twisted nematic (TN) liquid crystal. An exit diffuser tends to redirect some of the light which is not normal to the display back into the normal direction which reduces the contrast ratio normal to the display. For example, with a TN display which may include a peak contrast ratio of 307:1, when an exit diffuser is added and the input light is collimated to ±10 degrees full width half maximum (FWHM) in air, the peak contrast ratio is reduced to 270:1.

For input collimation of ±15 degrees FWHM, the peak contrast ratio is 251:1 and for input collimation of ±20 degrees FWHM, the peak contrast ratio is 223:1. So as the degree of input collimation is reduced with the same exit diffuser, the peak contrast ratio is reduced. A contrast ratio of greater than 200:1 is desirable, but in actual use conditions the contrast ratio is greatly reduced by ambient light reflection from the front surface of the display, especially the anti-glare coating (which diffuses light into all directions to avoid direct reflections of lighted regions), if one is present.

With a high resolution collimate and post diffuse type display (greater than about 100 ppi), inadequate collimation of the backlight can result in unacceptable depixelization of the display. The depixelization occurs because the area which is illuminated on a diffuser by the light transmitted by one subpixel expands into the area illuminated by the light from another subpixel. The degree of depixelization depends on the distance from the diffuser to the color filters, which are on the inside of the cell, (e.g., the distance equals the thickness of the front substrate, e.g., the color filter substrate, and the thickness of the polarizer) and the degree to which the backlight is collimated. The more the backlight is collimated, the lower the overall efficiency of the backlight. So it is desirable to limit the amount of collimation required as much as possible.

Referring to FIG. 1, the depixelization can be characterized by a width w of the subpixel image on a diffuser 2 (e.g., at 50% peak intensity) divided by subpixel pitch p. The depixelization is given by Depixelization=(subpixel opening size+2×spread)/pixel pitch, where spread is the thickness of the substrate (and polarizer) times the tangent of the angle of light of 50% peak intensity in the substrate relative to the substrate normal.

A depixelization ratio of less than about 1.6 is probably acceptable. For example, with a 120 ppi vertical stripe triad display, the horizontal subpixel pitch p is about 71 microns with an opening 4 (subpixel opening) in a black matrix 6 of about 56 microns wide. If input light 5 is collimated to ±20 degrees FWHM in air, CF substrate 7 is 0.7 mm thick and a front polarizer 11 is 150 microns thick, both of which have an index of refraction of about 1.5, the depixelization is approximately equal to (56+2(850 tan(20/1.5)))/213=2.15. Note that in the horizontal direction the pixel pitch is 3 times the subpixel pitch. A thin film transistor substrate 9 (0.7 mm thick) is also shown with a polarizer 13 (150 microns thick).

Therefore a need exists for devices and methods which provide reduced depixelization from high resolution collimate and post diffuse type liquid crystal display devices. Additionally, a need exists for devices and methods, which provide an improved process window for electrical connections to an array substrate and which reduce the probability of breaking of display substrates for a portable display when the substrates are reduced in thickness.

SUMMARY OF THE INVENTION

A display device and method for fabricating a liquid crystal cell are disclosed. A liquid crystal cell includes a first substrate, and a second substrate attached to the first substrate. The first substrate has a same thickness as the second substrate. The first substrate is lapped at a first rate while concurrently lapping the second substrate at a second rate, which is different from the first rate. The first substrate and the second substrate are thinned to different thicknesses. The thinner of the first and second substrates is provided on a viewer side of a collimate and post diffuse type liquid crystal cell to reduce depixelization.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention includes modifying a glass thinning process so that a color filter (CF) substrate is thinned more than an array substrate. By providing a method in accordance with the present invention, reduced depixelization is achieved, especially for high resolution collimate and post diffuse type displays. For example, with the 120 ppi vertical triad collimate and post diffuse display described above, a reduction in thickness of the CF substrate to about 0.4 mm thick results in a depixelization approximately equal to (56+2(550 tan(20/1.5)))/213=1.49, instead of an unacceptable 2.15.

Advantageously for portable displays, as a result of the thinner CF substrate, a thicker array substrate may be employed. In this way, a same total amount of glass can be removed from the display device as a whole, providing the same thickness and weight reduction, but the process window for attachment of electrical connections to the array substrate is improved and the breakage reduced.

The present invention provides benefits even if chip-on-glass (COG) is not used and the more traditional tape carrier package (TCP) is used where the driver chips are mounted on a flex circuit which is bonded to the display.

In a normal thinning process, after the array substrate and the color filter substrate are fabricated, a region including one or two displays is cut from the piece of glass on which the substrates were fabricated. The array and color filter substrates are stacked, aligned and joined to form a display device. Then, a top surface and a bottom surface are thinned to provide the array substrate and the color filter substrate with a same thickness. In accordance with the present invention, the array substrate and the color filter substrate are provided with different thicknesses. In a preferred embodiment, the color filter substrate is thinned to a thickness less than the array substrate. For a collimate and post diffuse type display, whichever substrate directed toward the viewer is thinned.

Figure 1:
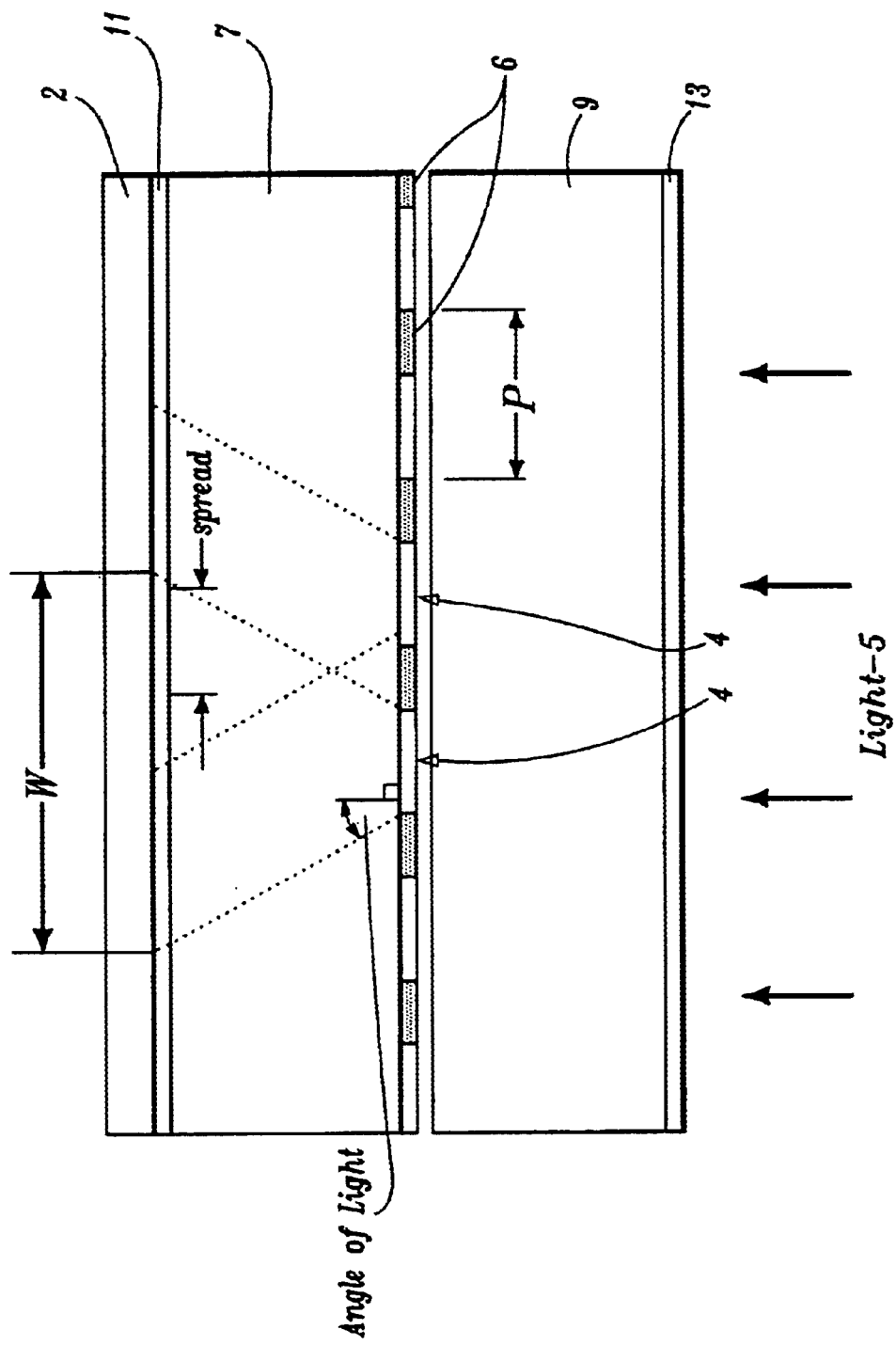
FIG. 1 is a schematic cross-sectional view showing depixelization in a collimate and post diffuse type display.
Figure 2:
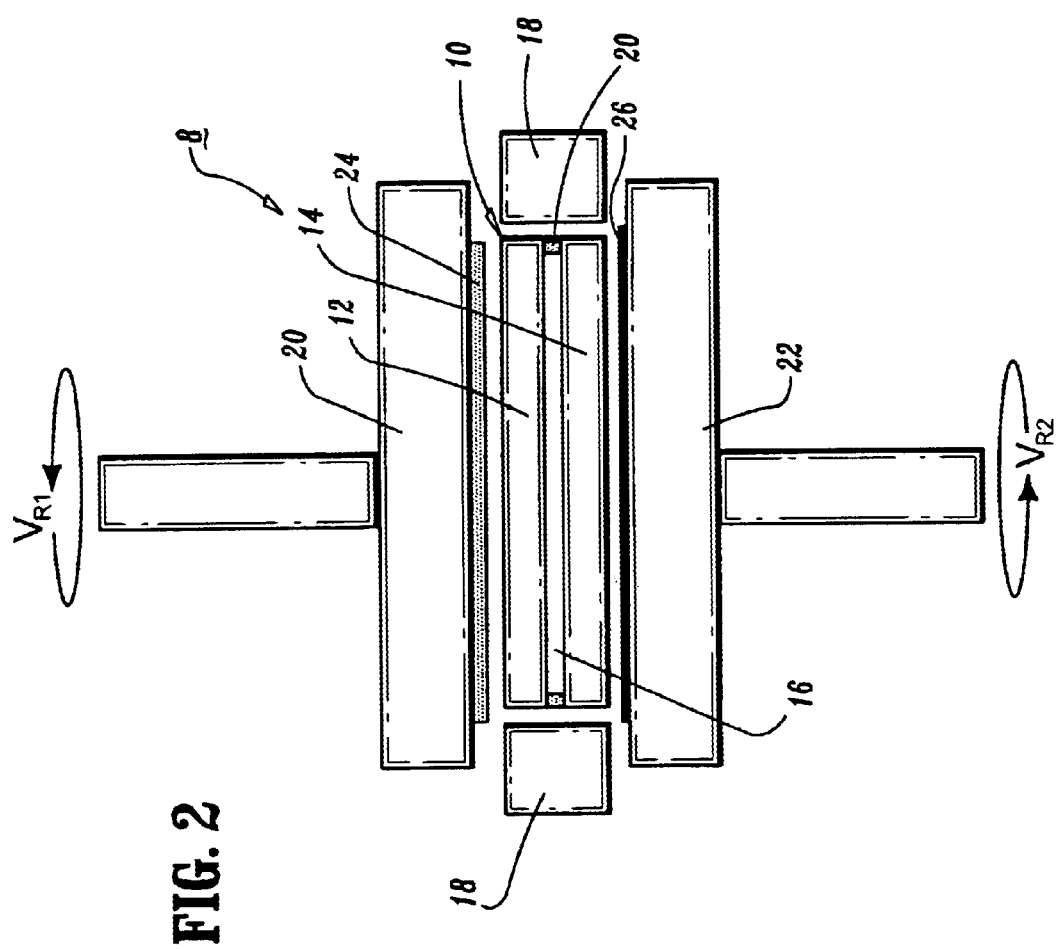
FIG. 2 is a schematic cross-sectional view showing a liquid crystal cell thinning tool in accordance with the present invention.

Referring now in detail to the figures in which like numerals represent the same or similar elements and initially to FIG. 2, an apparatus 8 for thinning substrates in accordance with the present invention is shown. A partially fabricated display device 10 includes a first substrate 12 and a second substrate 14. First substrate 12 and second substrate 14 are joined with a gap 16 remaining therebetween for liquid crystal. A seal 20 is provided at the periphery to prevent leakage of liquid crystal.

In one embodiment, first substrate 12 includes a color filter (CF) substrate and second substrate 14 includes a thin film transistor (TFT) array substrate. Substrates 12 and 14 preferably include glass or other polishable materials.

Apparatus 8 includes a jig or chuck 18 which secures device 10 during lapping and/or polishing. Lapping is performed with rough abrasives. Lapping is employed to reduce a majority of the thickness, very little material is removed by polishing. A polishing step may be performed after the lapping step to provide a smooth surface finish. Abrasives employed for lapping may include, for example, $Al_2O_3$, $SiO_2$, SiC or other abrasives preferably with a size of between about 0.008 mm to about 0.015 mm in diameter. After lapping an average surface roughness may be about 0.0002 to about 0.0003 mm. Abrasive polishing may employ $CeO_2$ with an average size of between about 0.001 to about 0.002 mm in diameter. After polishing, average surface roughness is preferably less than about 0.00001 mm.

Device 10 may include any liquid crystal device having substrates capable of being lapped and polished. In one embodiment, device 10 includes a collimate and post diffuse type display although other types of displays may be employed. A first plate 20 is employed for lapping and polishing first substrate 12, and a second plate 22 is employed for lapping and polishing second substrate 14. Plates 20 and 22 may be made from, for example steel material and include abrasives 24 and 26. Abrasives 24 and 26 may be distributed on plates 20 and 22 in the form of a slurry in the surface of plates 20 and 22.

In accordance with the present invention, first plate 20 may be turned with a rotational velocity $V_{R1}$ different from a rotational velocity $V_{R2}$ of second plate 22. In this way one of the two substrates 12 and 14 is thinned at a faster rate than the other. Rotational velocities for plates may be adjusted within a preferred range of between about 20 rotations per minute (rpm) and about 30 rpm. In one embodiment, lapping is performed at different rates for plates 20 and 22 while polishing of plates 20 and 22 is performed at a same or at different rates.

Advantageously, a color filter substrate (e.g., second substrate 14) is thinned to a greater extent than first substrate 12. This provide two advantages. First, since the color filter plate is thinner, depixelization for high resolution collimate and post diffuse type displays is reduced and higher pixel resolution can be achieved. Secondly, for portable displays, the thin film transistor plate is permitted to be thicker reducing the probability of cracking and increasing the process window for electrical connection while providing the same advantages of reduced weight and thickness.

Figure 3B:
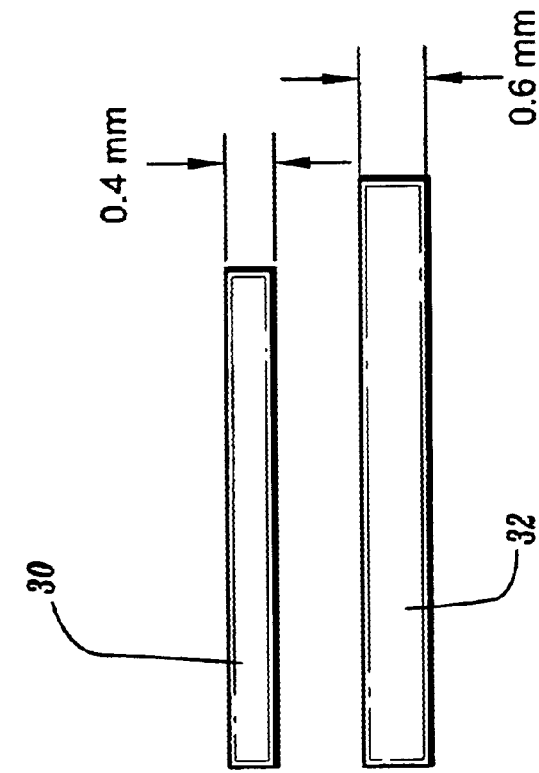
FIG. 3B is a side view of the color filter substrate and the thin film transistor substrate shown in FIG. 3A after thinning in accordance with the present invention.
Figure 3A:
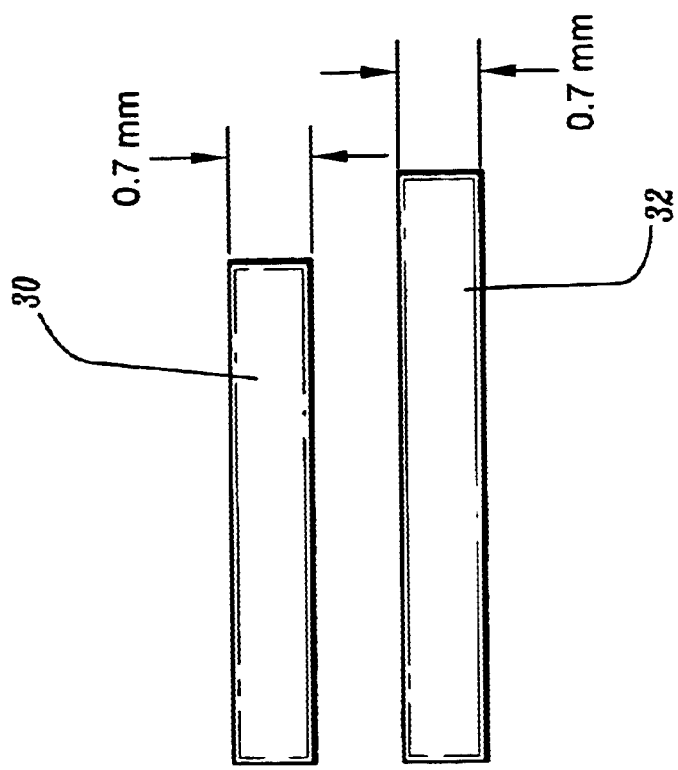
FIG. 3A is a side view of a color filter substrate and a thin film transistor substrate before thinning in accordance with the present invention.

Referring to FIGS. 3A and 3B, a schematic side view representation of the thinning process in accordance with the present invention is illustratively shown. Only the substrates are shown in FIGS. 3A and 3B for simplicity. In FIG. 3A, a color filter substrate 30 and a thin film transistor array substrate 32 are cut to size from a large piece of mother glass (not shown) and joined. In the illustrative embodiment shown, both substrates 30 and 32 have a same thickness, e.g., 0.7 mm. In FIG. 3B, substrates 30 and 32 are thinned as described with reference to FIG. 2, after joining.

As illustratively indicated in FIG. 3B, color filter substrate 30 is thinned to about 0.4 mm while thin film transistor substrate 32 is thinned to 0.6 mm. Advantageously, a total thickness of 1.0 mm is maintained for substrates 30 and 32 to maintain weight and thickness for the display device. For a conventional process, the thinning may leave both color filter and thin film transistor substrates at 0.5 mm (for a total of 1.0 mm) without the advantages of the present invention. Other start and thinned dimensions are contemplated by the present invention.

Figure 4:
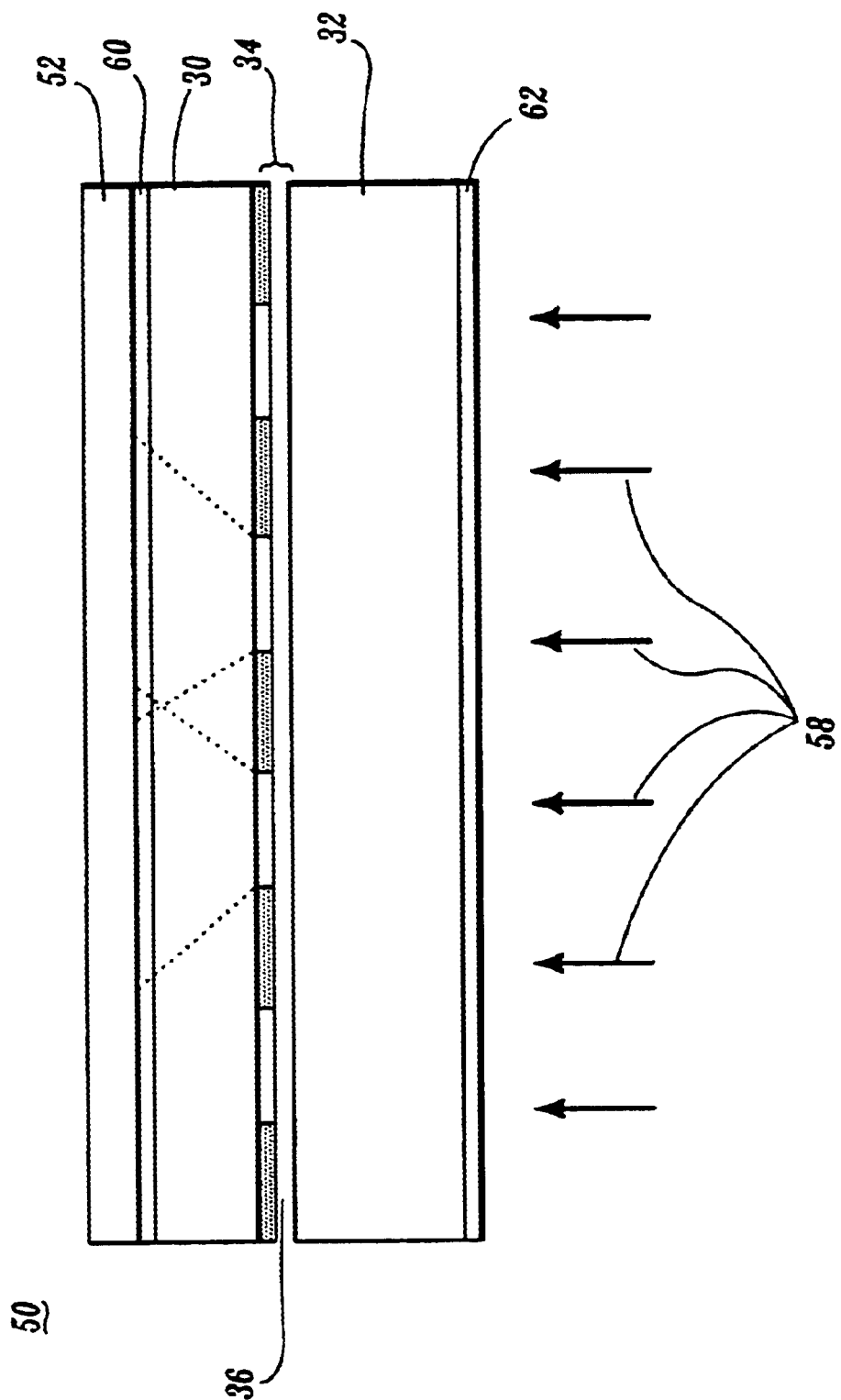
FIG. 4 is a schematic cross-sectional view of a collimate and post diffuse type liquid crystal display in accordance with the present invention.

Referring to FIG. 4, a collimate and post diffuse display device 50 is shown in accordance with the present invention A color filter (CF) substrate 30 and a thin film transistor (TFT) array substrate 32 are stacked and include a gap 34 therebetween. Gap 34 is filled with liquid crystal 36. Array substrate 32 includes a pixel array with thin film transistors which address pixel electrodes. Pixel electrodes are used to control the light transmission through the liquid crystal in conjunction with polarizers 60 and 62.

Color filter substrate 30 includes a color filter layer to filter back lighting 58 to permit one of red, green or blue light to propagate through the display. Each pixel in the array includes a subpixel corresponding to red, green and blue.

A diffuser 52 is attached to a polarizer 60 on color filter substrate 30. Substrate 30 and polarizer include a smaller thickness than substrate 32 and polarizer 62 in accordance with the present invention. Openings in the black matrix permit light from pixels to pass through substrate 30 and polarizer 60 into diffuser 52. Advantageously, by the present invention, depixelization is reduced to an acceptable level while substrate 32 retains adequate thickness for crack resistance and easy electrical interconnection.

It is to be understood that a plurality of different lapping/polishing setups may be employed with the present invention. One such setup is illustratively shown in FIG. 5.

Figure 5:
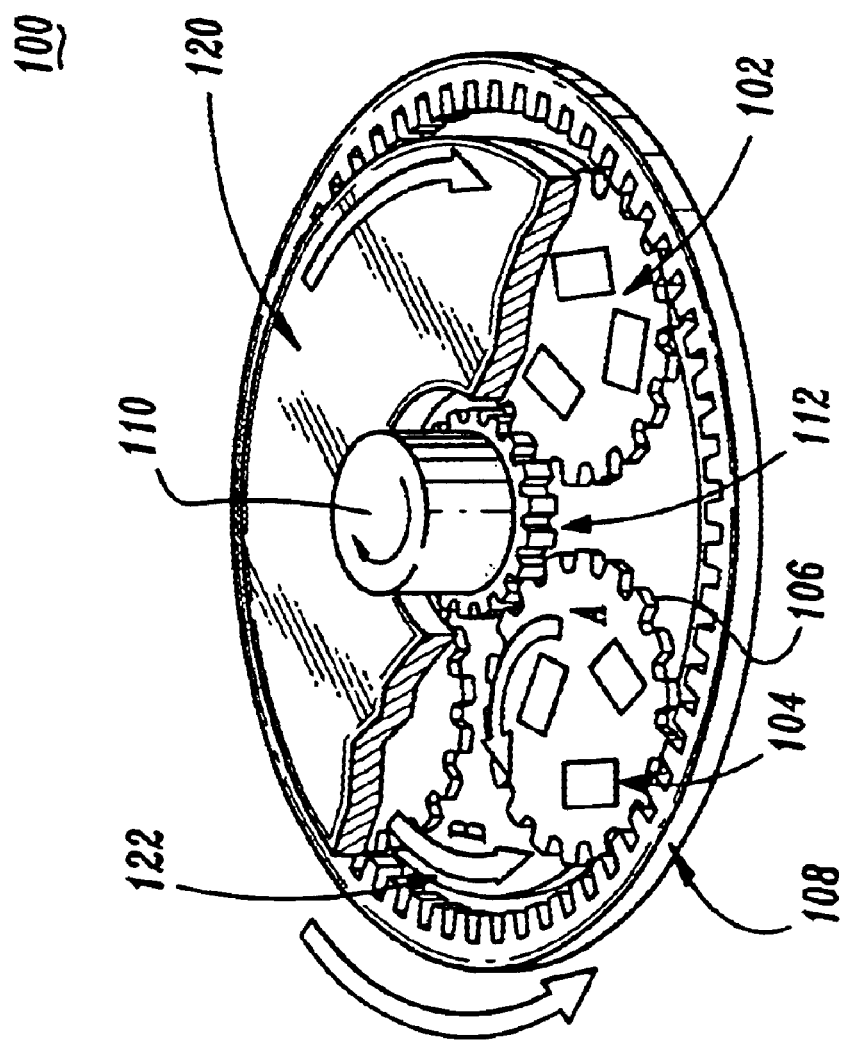
FIG. 5 is a perspective view of a mechanical thinning tool for use in accordance with the present invention.

Referring to FIG. 5, a mechanical thinning tool 100 is shown for employing the present invention. Carriers 102 include display cells 104 encapsulated in carriers 102. Carriers 102 may include an glass-filled epoxy resin which captures cells 104 and gear teeth 106 which engage an internal gear 108. A hub 110 includes a sun gear 112 which rotates to provide a rotation in the direction or arrow A as well as rotation in the direction of arrow B. Upper plate 120 and lower plate 122 include pads with slurry (including abrasives), which provide lapping and polishing of cells 104.

Having described preferred embodiments for the construction of LCD cells, preferably high resolution collimate and post diffuse type displays, by mechanical thinning of a color filter substrate and methods thereof (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for fabricating a collimate and post diffuse type liquid crystal cell, comprising the steps of:
   providing a liquid crystal cell having a first substrate, and a second substrate attached to the first substrate, the first substrate having a same thickness as the second substrate, wherein the same thickness includes 0.7 mm;
   lapping the first substrate at a first rate;
   concurrently lapping the second substrate with the lapping of the first substrate, the lapping of the second substrate including a second rate different from the first rate, such that the first substrate and the second substrate are thinned to different thicknesses, wherein the different thicknesses include 0.4 nun and 0.6 mm;
   polishing the first and second substrates; and
   providing the thinner of the first and second substrates on a viewer side of the collimate and post diffuse type liquid crystal cell to reduce depixelization.

2. The method as recited in claim 1, wherein the first substrate includes a color filter substrate and the first rate is greater than the second rate.

3. The method as recited in claim 1, wherein the step of lapping the first substrate includes the step of providing an abrasive material on a plate and rotating the plate to lap the first substrate.

4. The method as recited in claim 1, wherein the step of concurrently lapping the second substrate includes the step of providing an abrasive material on a plate and rotating the plate to lap the second substrate.

5. The method as recited in claim 1, wherein the step of polishing is performed at a same polish rate for the first and second substrates.

6. A method for fabricating a collimate and post diffuse liquid crystal cell, comprising the steps of:
   providing a liquid crystal cell having a first substrate, and a second substrate attached to the first substrate, the first substrate having a same thickness as the second substrate;
   lapping the first substrate at a first rate by contacting a first rotating plate with the first substrate;
   concurrently lapping the second substrate at a second rate by contacting a second rotating plate with the second substrate wherein the second rate is different from the first rate to provide the first substrate and the second substrate with different thicknesses;
   polishing the first and second substrates; and
   providing the thinner of the first and second substrates on a viewer side of the collimate and post diffuse type liquid crystal cell to reduce depixelization to provide a depixelization ratio of less than about 1.6.

7. The method as recited in claim 6, wherein the first substrate includes a color filter substrate and the first rate is greater than the second rate.

8. The method as recited in claim 6, wherein the step of lapping the first substrate includes the step of providing an abrasive material on the first plate.

9. The method as recited in claim 6, wherein the step of concurrently lapping the second substrate includes the step of providing an abrasive material on the second plate.

10. The method as recited in claim 6, wherein the same thickness includes 0.7 mm.

11. The method as recited in claim 10, wherein the different thicknesses include 0.4 mm and 0.6 mm.

12. The method as recited in claim 6, wherein the step of polishing is performed at a same polish rate for the first and second substrates.

13. A collimate and post diffuse type display device, comprising:
    a color filter substrate;
    a thin film transistor array substrate coupled to and spaced apart from the color filter substrate to from a gap,
    a liquid crystal layer disposed in the gap between the color filter substrate and the thin film transistor substrate; and
    the color filter substrate including a thickness which is less than a thickness of the thin film transistor array substrate to provide a depixelization ratio of less than about 1.6.

14. The display device as recited in claim 13, further comprising a diffuser attached to the color filter substrate.

15. The display device as recited in claim 13, wherein the color filter substrate thickness is about 0.4 mm.

16. The display device as recited in claim 15, wherein the thin film transistor array substrate thickness is about 0.6 mm.

17. A collimate and post diffuse type display device, comprising:
    a color filter substrate;
    a thin film transistor array substrate coupled to and spaced apart from the color filter substrate to from a gap;
    a liquid crystal layer disposed in the gap between the color filter substrate and the thin film transistor substrate; and
    the color filter substrate including a thickness which is less than a thickness of the thin film transistor array substrate to provide a depixelization ratio of less than about 2.0.

18. A method for fabricating a collimate and post diffuse type liquid crystal cell, comprising the steps of:
    providing a liquid crystal cell having a first substrate, and a second substrate attached to the first substrate, the first substrate having a same thickness as the second substrate;
    lapping the first substrate at a first rate;
    concurrently lapping the second substrate with the lapping of the first substrate, the lapping of the second substrate including a second rate different from the first rate, such that the first substrate and the second substrate are thinned to different thicknesses;
    polishing the first and second substrates; and
    providing the thinner of the first and second substrates on a viewer side of the collimate and post diffuse type liquid crystal cell to reduce depixelization,
    wherein the step of providing the thinner of the first and second substrates includes the step of providing a depixelization ratio of less than about 2.0.

* * * * *